Figure 6:
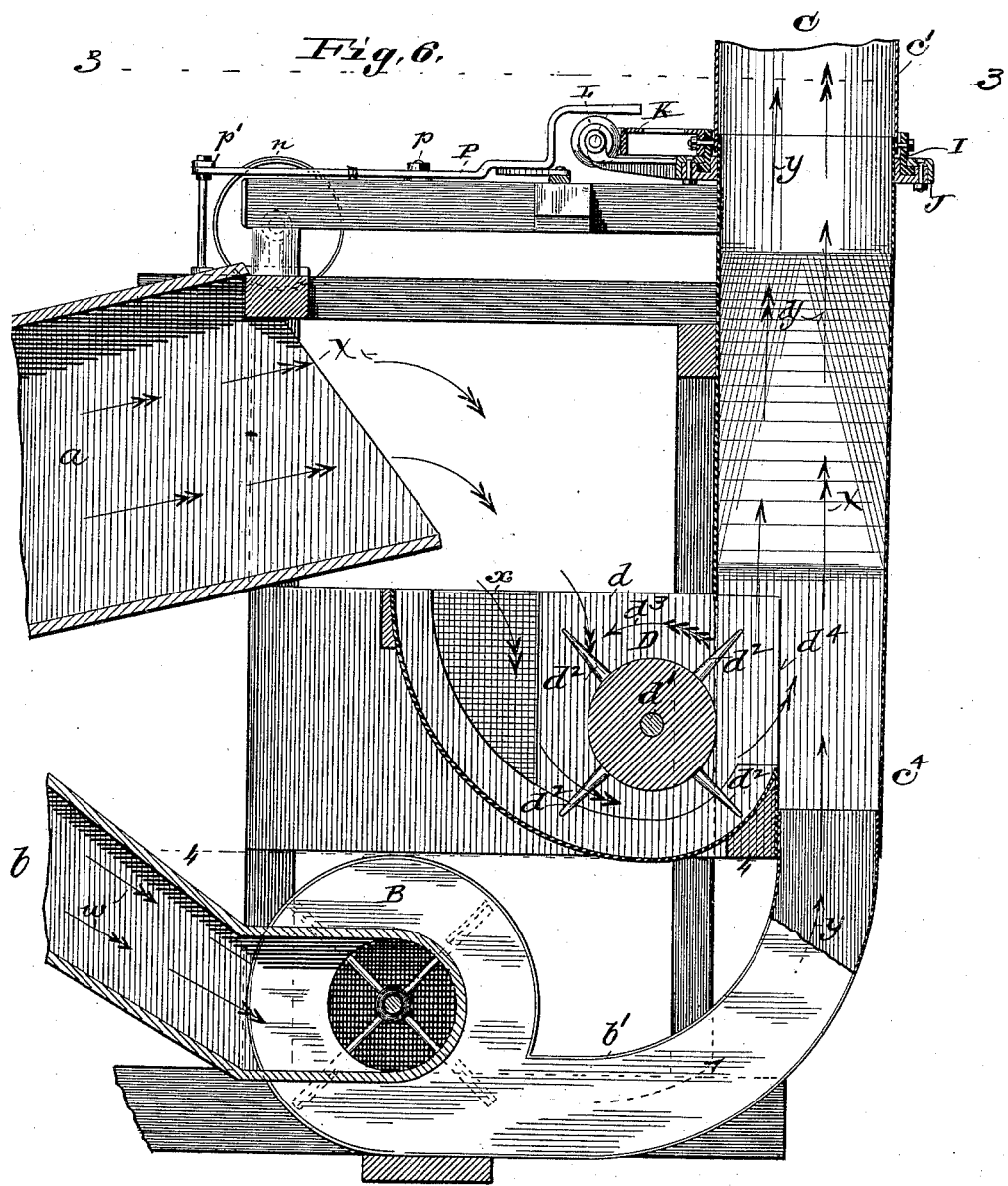

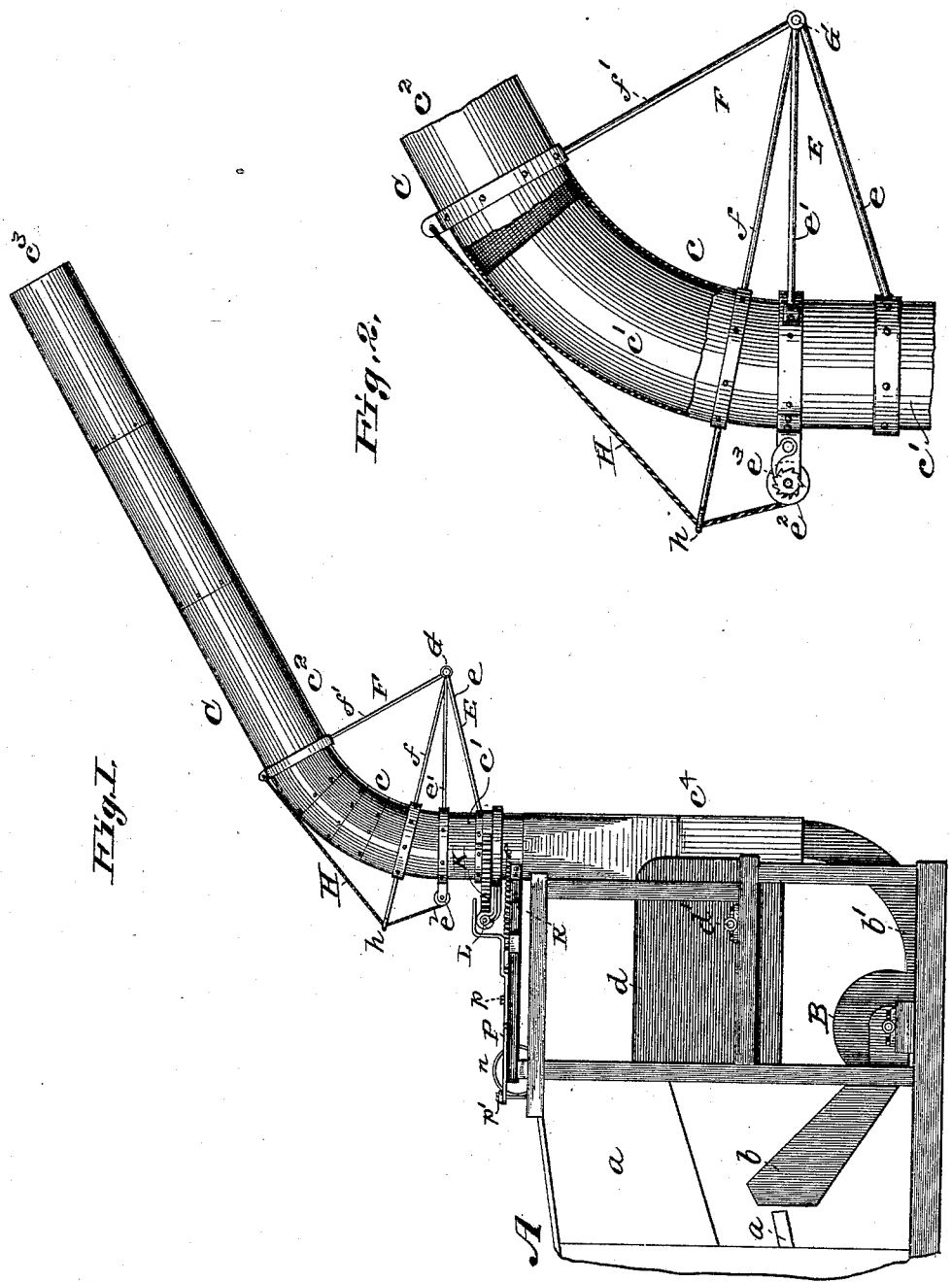

(No Model.) 4 Sheets—Sheet 2.
N. G. ROSS.
APPARATUS FOR MOVING STRAW, &c.
No. 424,433. Patented Mar. 25, 1890.
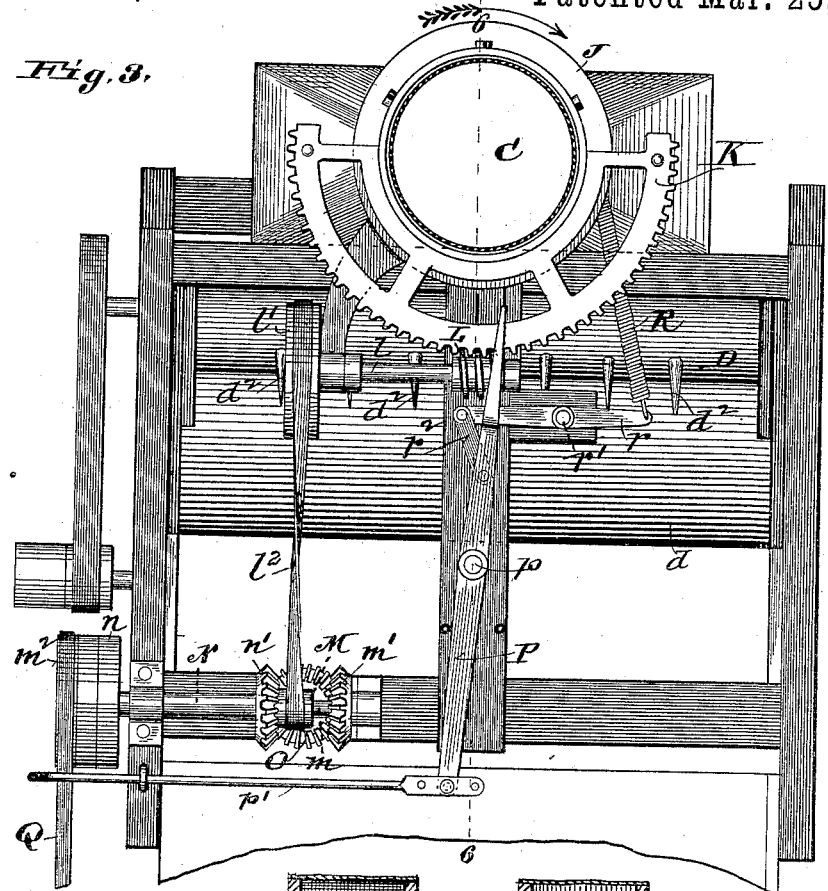
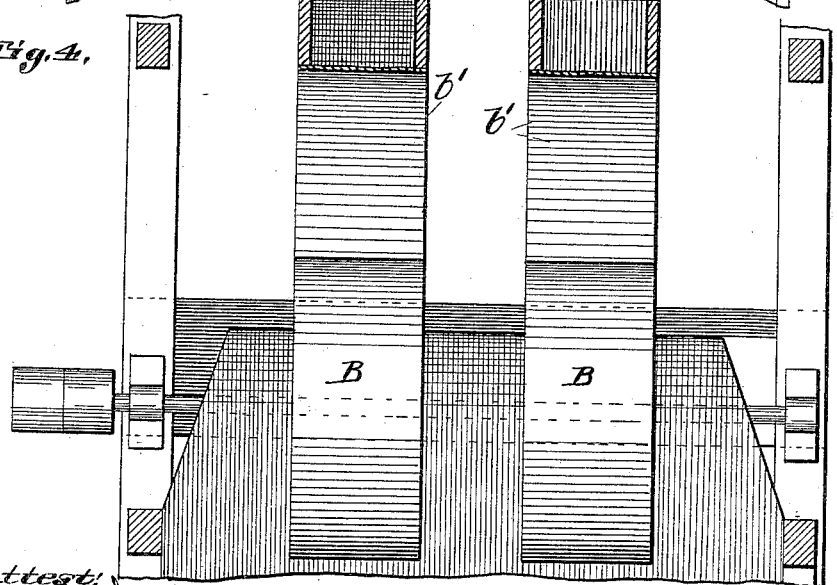

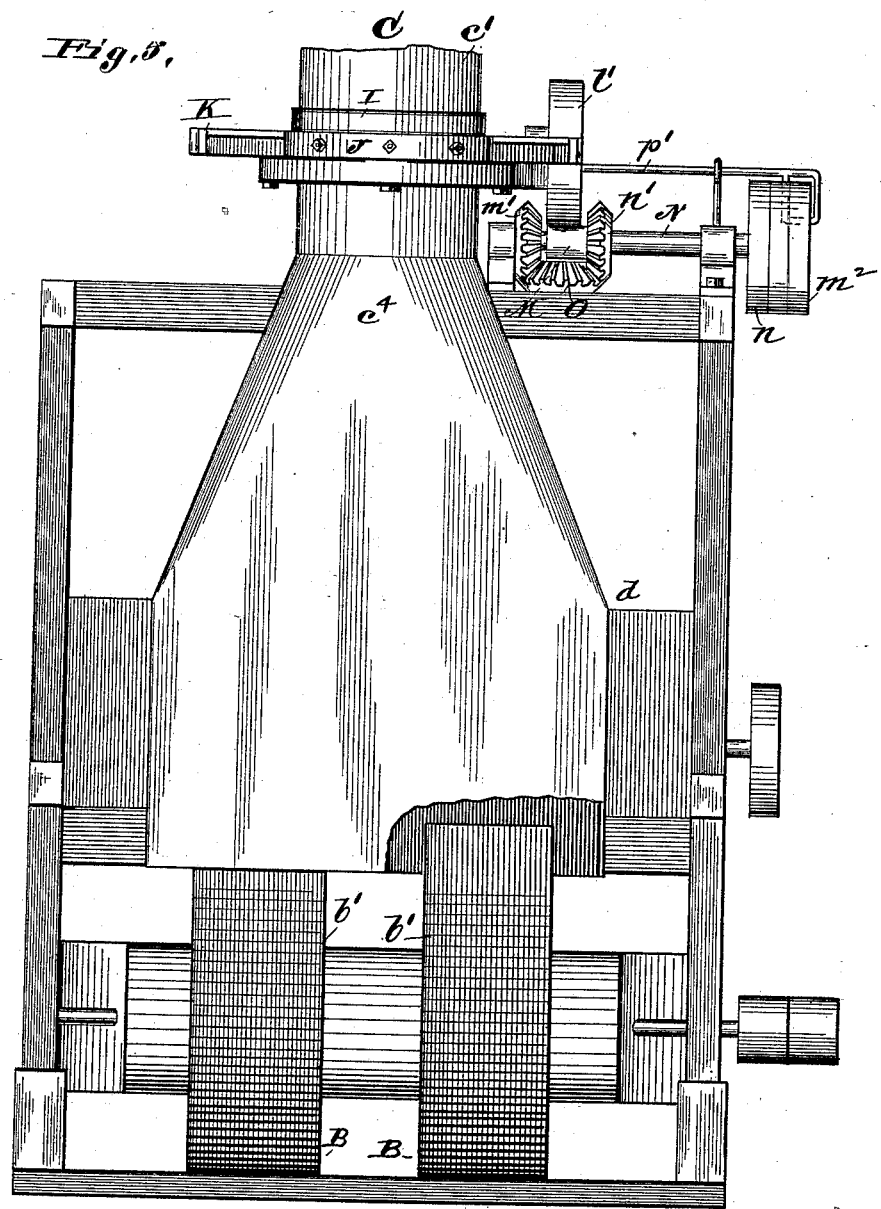

(No Model.) 4 Sheets—Sheet 4.

N. G. ROSS.
APPARATUS FOR MOVING STRAW, &c.

No. 424,433. Patented Mar. 25, 1890.

Attest:
Thos. E. Sanford
M. L. Levy

Inventor:
Noble G. Ross
by C. D. Moody
his atty

UNITED STATES PATENT OFFICE.

NOBLE G. ROSS, OF CENTRE, ASSIGNOR TO THE CYCLONE MANUFACTURING COMPANY, OF NEW LONDON, MISSOURI.

APPARATUS FOR MOVING STRAW, &c.

SPECIFICATION forming part of Letters Patent No. 424,433, dated March 25, 1890.

Application filed August 30, 1889. Serial No. 322,437. (No model.)

*To all whom it may concern:*

Be it known that I, NOBLE G. ROSS, of Centre, Ralls county, Missouri, have made a new and useful Improvement in Apparatus for Moving Straw and other Stalked Material, of which the following is a full, clear, and exact description.

In carrying out this improvement a pneumatic tube and an air-moving apparatus are employed. I do not, however, broadly claim moving material by means of an air-current, being well aware that various substances have therewith been and for various purposes transferred to points more or less remote. In the present instance the transfer of the material is effected by means of the joint action of a stalk separating and injecting device and an air-moving device and tube—that is to say, the straw or other stalked material to be moved is injected into the pneumatic tube through a separate inlet and by other means than the air-moving device and with sufficient momentum to overcome any back-pressure caused by the air-current which is delivered into the pneumatic tube at a point in advance of the material-injecting inlet, and, after it has been thus injected into the pneumatic tube, the material is borne along by the influence of the air-current and delivered at the desired point. For it is impracticable to introduce the material into the pneumatic tube *via* the air-moving device, and hence it is necessary to introduce it thereinto through a separate inlet. I have further ascertained that such separate inlet must be located between the air-inlet and the point at which the material leaves the pneumatic tube, and also, if the momentum of the material as it is injected is insufficient to overcome the force of the air-current, the material is prevented from entering the pneumatic tube. The air-moving device may be any ordinary means for creating an air-blast, the pneumatic tube may be of any size and shape and extent suited to the capacity of the blower and adapted for transmitting the material being moved, and the injector may be any device adapted for taking hold of the material and delivering it, as described, into the pneumatic tube. The direction of such delivery should be so as not to materially thwart the action of the air-current, to which end the direction of the entering material should not be contrary to that of the air-current, rather in the same direction. Care must also be taken to prevent the straw or other material from entering the pneumatic tube in large bunches, wads, or lumps, but in a disintegrated form, substantially as is hereinafter set forth and claimed, aided by the annexed drawings, making part of this specification, and exhibiting what I consider a suitable apparatus for carrying out the herein-described improvement.

In the drawings, Figure 1 is a side elevation of a straw-stacker attached to the delivery end of a thrasher, the shaded portion of the figure being the improved stacker; Fig. 2, a side elevation, partly in section, of the elbow portion of the pneumatic tube; Fig. 3, a horizontal section on the line 3 3 of Fig. 6; Fig. 4, a horizontal section on the line 4 4 of Fig. 6; Fig. 5, an outer end elevation of the stacker; Fig. 6, a vertical section on the line 6 6 of Fig. 3.

The views are not all upon the same scale.

The same letters of reference denote the same parts.

Being well adapted therefor, the improvement is shown embodied in what is called a "straw-stacker," such as used to transfer and stack the straw coming from an ordinary thrasher A, Fig. 1, of which only the delivery-end portions $a$ are shown.

B represents the air-moving device. It is an ordinary fan, taking the air into it through the inlet $b$ and discharging the air through the outlet $b'$ into the pneumatic tube C, Figs. 1, 2, 6, 3, and 5.

D, Fig. 6, represents the injector. The straw is delivered from the thrasher into the casing $d$, which serves to inclose the movable portion of the material-injecting device. Such movable portion is substantially a revolving shaft $d'$, provided with fingers or points $d^2$. The direction of the revolution of this shaft is indicated by the arrow $d^3$. The fingers $d^2$ act to force the straw through the casing $d$, and to deliver it with sufficient force through the outlet $d^4$ into the pneumatic tube C. The direction of the movement of the material is substantially indicated by the doubleheaded arrows X, Fig. 6. The construction of the injector D is such that it also serves to break up the bunches, wads, or lumps into which the straw coming from the thrasher is liable to form, and cause the straw to be delivered almost entirely in the form of separated stalks into the pneumatic tube, whereby the material is prevented from obstructing the pneumatic tube, and the air-current enabled to act efficiently upon the straw and bear it along through the pneumatic tube to the point of delivery. The use of the fingers or points $d^2$ is necessary in this last-named respect, in contradistinction to any construction which will simply force the straw into the pneumatic tube.

The fan B is operated by any customary means, and the injector D is rotated by means of a familiar nature; but, as stated, the force exerted by the injector is great enough to deliver the straw into the pneumatic tube against any air-pressure exerted by the air-current through the outlet $d^4$ in the direction of the injector. The direction of the air-current is indicated by the arrows $y$, Fig. 6.

So far as the pneumatic tube is concerned it can be variously constructed, provided it is adapted to admit the air-current and straw in the manner described—that is, it may be extended beyond the outlet $d^4$ in any desired direction—and it may be a single rigid tube, or it may be in parts and be adjustable horizontally and vertically. To render the device more complete, both said adjustments are embodied in the pneumatic tube. As shown in Figs. 1 and 2, an elbow $c$ is formed therein, and the tube is made in sections $c'$ and $c^2$. The section $c^2$ is slipped onto the section $c'$. By means of the braces E F, attached, respectively, to the sections $c'$ $c^2$ and extended and journaled upon each other at the point G the outer section $c^2$ is supported so that it can be drawn out and closed upon the inner section. When the outer section is drawn outward, its outer end $c^3$ points more in a downward direction, and when it is closed upon the inner section the end $c^3$ points more in an upward direction. Each brace E F is shown made in two parts $e$ $e'$ and $f$ $f'$, respectively, and the described adjustment of the section $c^2$ is effected by means of a cord H, one end of which is secured to the brace part $f'$ and the other end thereof wound upon a windlass $e^2$, journaled in the brace part $e'$ and provided with a ratchet and pawl $e^3$, as shown, and between the brace part $f'$ and windlass carried over a bearing $h$ upon the brace part $f$, substantially as shown. By winding the cord upon the windlass the outer tube-section is closed upon the inner tube-section, and by unwinding the cord the outer tube-section, by reason of its weight, moves outward upon the inner tube-section.

The horizontal adjustment of the pneumatic tube is provided for as follows: The inner tube-section $c'$ at its lower end is journaled upon a third fixed section $c^4$ of the pneumatic tube. The section $c'$ is provided with a collar I, which turns in another collar J, Figs. 3 and 6, attached to the section $c^4$, substantially as shown, whereby all that portion of the pneumatic tube above the section $c^4$ can be swung around horizontally and the end $c^3$ pointed to any desirable quarter. The collar I is provided with a toothed segment K, and L, Figs. 3 and 6, represents a worm-gear engaging therewith. The gear L is attached to a shaft $l$, carrying a pulley $l'$, from which a belt $l^2$ leads to a pulley M on the shaft $m$. This shaft $m$ is journaled in an outer shaft N, Fig. 3, and it is also provided with the bevel-gear $m'$ and the pulley $m^2$. The shaft N is provided with the pulley $n$ and bevel-gear $n'$. The two bevel-gears $m'$ $n'$ are brought into engagement by means of the third bevel-gear O, Figs. 5 and 3. By means of the shifter P, pivoted at $p$ and provided with the rod $p'$, Figs. 5 and 3, the driving-belt Q can be shifted to and from the pulleys $m^2$ $n$, and the segment K and tube-sections $c'$ $c^2$ thereby rotated horizontally in either desired direction. The spring R, lever $r$, pivoted at $r'$, and the link $r^2$, Fig. 3, which connects the parts R $r$ with the shifter P, constitute what may be termed a "spring-toggle lock," which yields when it is necessary to shift the belt, but which operates to secure the shifter in either of its positions against accidental displacement.

It is desirable to employ two fans B B, Fig. 4, rather than a single fan, and to lead their outlets $b'$ $b'$ into the same tube C, substantially as shown in Figs. 4 and 5. The chaff from the thrasher may, as indicated by the arrows $w$, Fig. 6, pass through the fans into the tube C.

Simply feeding the stalked material into the pneumatic tube as granular substances have heretofore been fed into an air-tube will not answer my present purpose. The material must be disintegrated, and the stalks must be substantially separated from each other as they are delivered into the pneumatic tube.

The fans or blowers B are a sufficient distance below the straw-injector D to permit the upward current to become vertical by the time it reaches a point opposite said injector. The fingers $d^2$ separate portions of straw from the mass fed to the injector, carry the same downward during their rotation, and then throw it vertically or nearly vertically upward into the ascending current produced by the fans, at the same time spreading apart or separating the butts of the straw, so that the air can enter the portion thrown into the ascending flue $c^4$ and obtain sufficient purchase to lift the same easily.

I claim—

1. In a straw-elevating apparatus, the combination, with the vertical pneumatic tubes and the fans or blowers driving air into the lower ends thereof and producing an upward current therein, of the rotary straw-injector situated a suitable distance above said fans or blowers and below the junction of said tubes, substantially as set forth.

2. The combination of the tube-sections $c'$ $c^2$, braces E F, cord H, and windlass $e^2$, substantially as described.

3. In a straw-elevating apparatus, the combination, with the vertical pneumatic tubes and the fans or blowers driving air into the lower ends thereof and producing an upward current therein, of the rotary straw-injector situated a suitable distance above said fans or blowers and below the junction of said tubes, said injector provided with fingers $d^2$, that separate portions of straw from the mass fed to the said injector, throwing the same upward into the pneumatic tube and simultaneously spread apart or separate the stalks in said portions, substantially as specified.

Witness my hand this 20th day of August, 1889.

NOBLE G. ROSS.

Witnesses:
C. D. MOODY,
D. W. A. SANFORD.